United States Patent [19]
Lyzinski et al.

[11] Patent Number: 6,113,820
[45] Date of Patent: Sep. 5, 2000

[54] METHOD TO REPAIR POLYETHYLENE CONTAINMENT SUMPS

[75] Inventors: David Lyzinski, Wheaton; Albert J. Kovach, Sugar Grove; Paul A. Sivak, Compton; Charles M. Daul, Libertyville, all of Ill.

[73] Assignee: BP Amoco Corporation, Chicago, Ill.

[21] Appl. No.: 09/022,345

[22] Filed: Feb. 11, 1998

[51] Int. Cl.[7] ................................................. B32B 35/00
[52] U.S. Cl. .......................... 264/36.15; 156/94; 156/98; 264/36.22; 427/140
[58] Field of Search ........................... 264/36.15, 36.22; 156/94, 98; 427/140

[56] References Cited

U.S. PATENT DOCUMENTS

| | | |
|---|---|---|
| 2,235,937 | 3/1941 | Linberg . |
| 3,772,113 | 11/1973 | Patrick . |
| 3,836,623 | 9/1974 | Matherly . |
| 3,930,068 | 12/1975 | Sloan . |
| 4,022,935 | 5/1977 | Kinney et al. . |
| 4,026,976 | 5/1977 | Anderso . |
| 4,222,975 | 9/1980 | Kirschke . |
| 4,255,845 | 3/1981 | Henderson . |
| 4,743,468 | 5/1988 | Jimenez .................................. 427/140 |
| 4,966,492 | 10/1990 | Poyda . |
| 5,332,335 | 7/1994 | Daul . |
| 5,470,605 | 11/1995 | Lundeen . |
| 5,814,693 | 9/1998 | Priest et al. . . |
| 5,870,871 | 2/1999 | Stewart . |

FOREIGN PATENT DOCUMENTS 0444446   4/1991   European Pat. Off. ...... C09D 123/10

OTHER PUBLICATIONS

Morton Polymer Systems' data sheet for THIOKOL ® RLP–2078 Chemical Resistant Elastomeric Coating, 2 pages, dated Oct. 1995.

Morton Polymer Systems' Product Review bulletin for THIOKOL ® RLP–2078 Chemical Resistant Elastomeric Coating, 4 pages, believed to be circulated about Oct. 1995.

Morton Polymer Systems' Product Review bulletin for THIOKOL ® T–235–M Two–Part, Non–Sag Joint Sealant, 2 pages, believed to be circulated about Oct. 1995.

*Primary Examiner*—Karen Aftergut
*Attorney, Agent, or Firm*—Robert A. Yesukevich

[57] ABSTRACT

A method of repairing polyethylene fuel containment sumps used in underground storage systems in gasoline and diesel service stations without "welding" the polyethylene, using suitable surface preparation, priming of the affected area, and sealing with a two part rubber compound.

1 Claim, 2 Drawing Sheets

METHOD TO REPAIR POLYETHYLENE CONTAINMENT SUMPS

CROSS REFERENCE TO RELATED APPLICATIONS

This application claims the benefit of the U.S. Provisional Application filed by Lyzinski et al., serial number not yet available, Feb. 14, 1997.

FIELD OF THE INVENTION

The invention relates to fuel containment sump repair, and more particularly to a method of repairing polyethylene fuel containment sumps used in underground systems in gasoline and diesel service stations.

BACKGROUND OF THE INVENTION

Technology for protecting the environment in gasoline service stations has continued to develop through the use of containment sumps in the fill area, submersible pump area and under the dispenser for an underground storage tank and piping system. These containment sumps can be constructed of polyethylene, a material that is extremely resistant to gasoline and oil. Typically, these sumps are structured in one or several parts, depending on the application and the depth below the surface of the pavement. A typical fill area and submersible pump area sump is constructed in three parts for ease of installation, as shown in FIG. 1.

These three parts may be characterized as a lower portion, an upper portion, and an optional cover. The lower portion can be mounted to a flange and sealed using a rubber gasket. Installing the lower portion first allows easy access for piping and electrical connections to be made. The upper portion may be connected to the lower portion using metal rings, rubber gasklets and bolts, as shown in FIG. 1. Alternative designs include a tongue and groove joint in the two portions or a threaded joint. Piping penetrations are also sealed using metal rings or a hose clamp to secure a rubber boot to the sump side wall and the penetrating pipe or conduit.

While the initial assembly of these sumps provides effectively tight containment, the sump often is exposed to various stresses that result in movement of the polyethylene in such a way that a tight seal is no longer possible. This can occur due to upward forces during high water periods; settling or shifting of the underground tank and piping; and cold flow of the polyethylene in the gasket area due to stress created by the flanges and bolts used to effect the seal. Additionally, these sumps can crack due to the stresses described above.

Repair of a polyethylene sump has proven to be very time consuming with only marginal effectiveness. Patching materials fail to work because polyethylene is extremely resistant to bonding with any material. As a result, all of the effective repair methods require a "welding" of the polyethylene to occur before an effective repair can be made.

SUMMARY OF THE INVENTION

This invention is a method of repairing polyethylene containment sumps without the use of a "welding" technique. The deformed or cracked polyethylene surface or leak is first cleaned of all debris, oil, films of any kind and, if possible, lightly buffed. The area immediately around the leak is then primed with a suitable primer for bonding a rubber compound to polyethylene, such as THIOKAL® TPR415, and allowed to dry. The leak is then filled with a gasoline resistant rubber compound, such as THIOKOL® T-2235-M or RLP-2078, which are flexible materials, to seal the damaged area. The material used to fill the leak must adhere to polyethylene and be able to withstand any hydraulic pressure caused by liquid either inside the sump or outside the sump. This material must not shrink away from the surface and must be fully resistant to gasoline of all grades.

DETAILED DESCRIPTION OF THE PREFERRED EMBODIMENT

Figure 1:
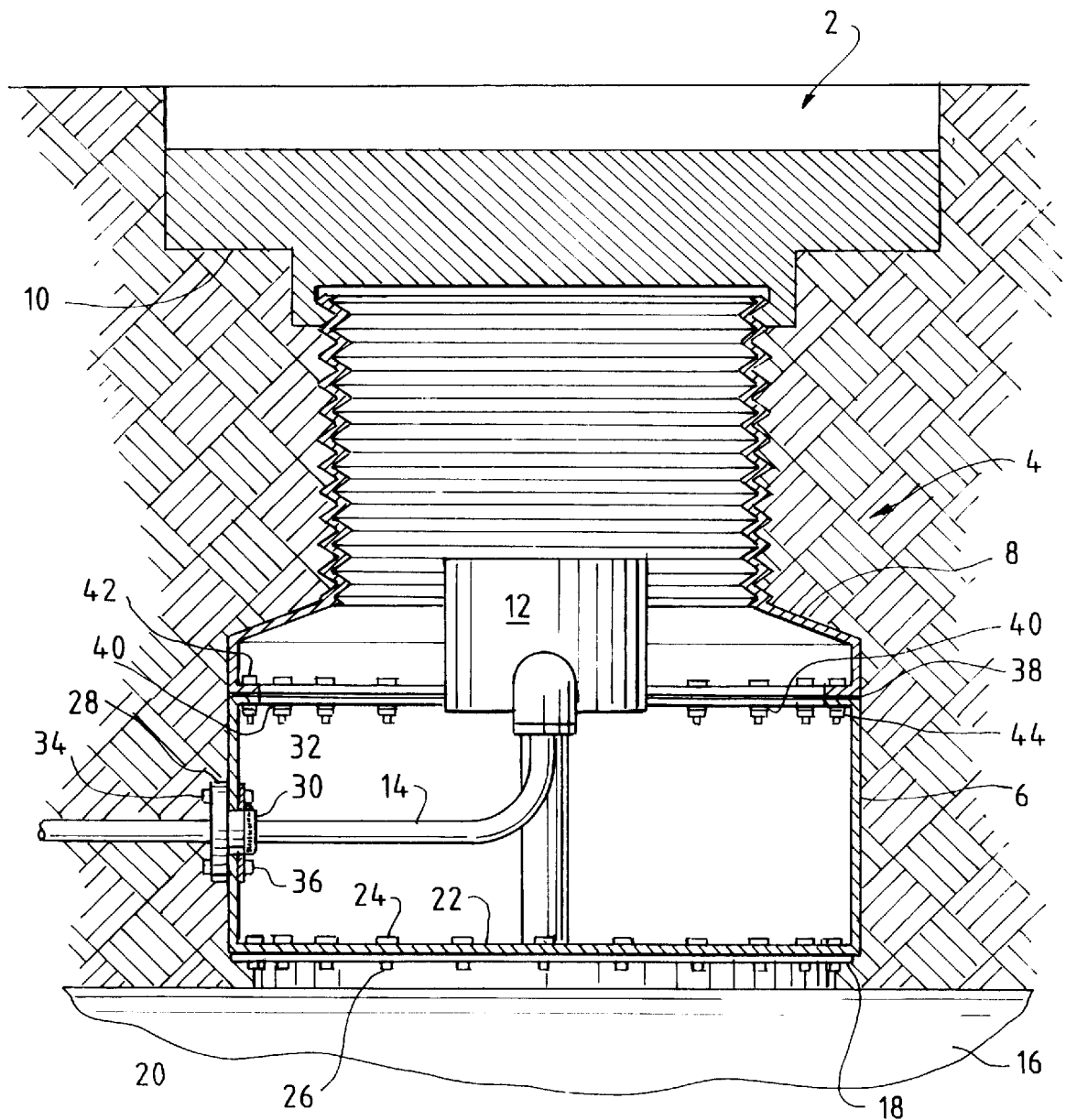
FIG. 1 is a cutaway side view of a typical polyethylene containment sump area.

Referring to FIG. 1, a submersible pump area 2 contains a submersible pump sump assembly 4 that comprises a lower section 6, an upper section 8, and an optional cover 10 to contain a submersible pump head 12 with a discharge line 14 mounted on an underground storage tank 16. The lower section 6 is typically fastened to a tank flange 18 on the storage tank 16 with a rubber gasket 20, metal ring 22, bolts 24 and nuts 26. The discharge line 14 is typically sealed with a rubber boot 28, hose clamp 30, metal ring 32, bolts 34 and nuts 36. The upper section 8 is typically mounted to the lower section 6 using a rubber gasket 38, metal rings 40, bolts 42 and nuts 44.

Figure 2:
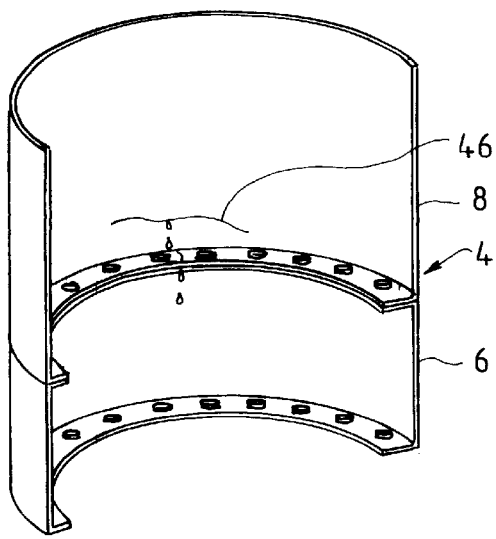
FIG. 2 is a partial cutaway side view of a polyethylene sump as shown in FIG. 1 that illustrates a typical leak.
Figure 3:
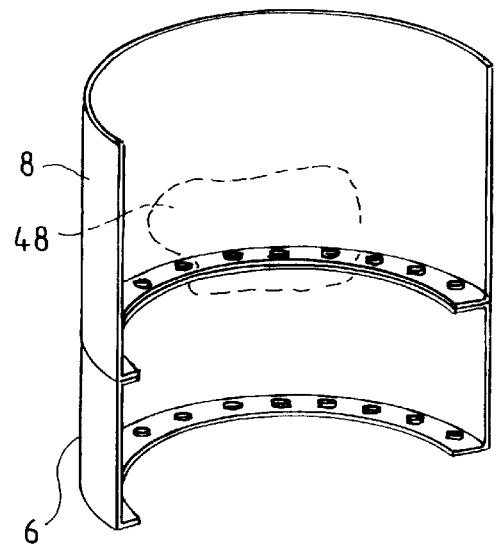
FIG. 3 shows the preparation of a sump leak for repair.

FIG. 2 shows a partial cutaway side view of a typical leak in the sidewall of the sump assembly 4, represented by a crack 46 in the upper section 8. Of course, such a crack 46 can appear anywhere upon the polyethylene sump assembly 4, so this is just one example. Referring to FIG. 3, the deformed or cracked polyethylene inner surface of the upper section 8 and lower section 6 in the vicinity of the crack 46 is first cleaned of all debris, oil, water, and films of any kind, as represented by an area 48 shown in dashed line. Cleaning is completed with a xylene washing of the crack 46 and surrounding area 48, followed by an acetone wash of the same area 48. All water must be removed and the area 48 to be repaired must be dry. If the crack 46 and surrounding area 48 have a smooth surface, it is preferred that the area 48 be scuffed with a non-sparking brush or paper.

In every case, once thoroughly cleaned, the area 48, including the crack 46, is then primed with a gasoline and other hydrocarbon resistant primer that is suitable for bonding a rubber compound to polyethylene, such as THIOKOL® TPR-415, and allowed to dry. The primer material is the foundation of the repair and must adhere to polyethylene, withstand any hydraulic pressure caused by liquid either inside the sump or outside the sump, and be flexible enough not to crack when expansion or contraction occurs.

Figure 4:
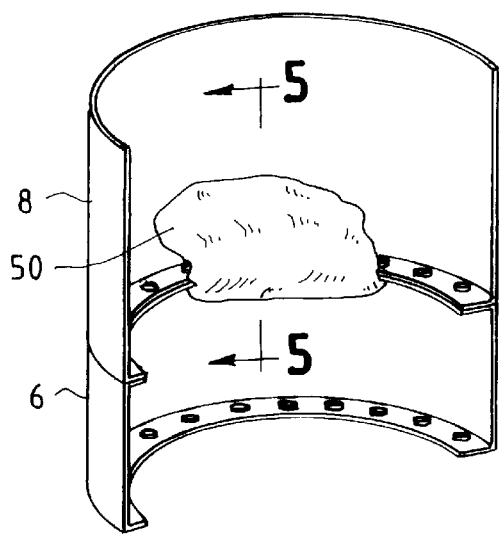
FIG. 4 shows the completed repair of a sump leak.
Figure 5:
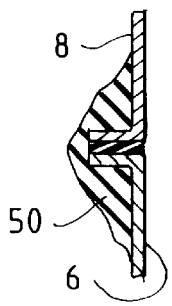
FIG. 5 is a cutaway side view of the sump leak repair shown in FIG. 4.

In the preferred embodiment, after priming with THIOKOL® TPR-415, the crack 46 and surrounding area 48 is then filled with a gasoline and other hydrocarbon resistant rubber compound, such as the two part, THIOKOL® T-2235-M or RLP-2078 polysulfide rubber to form a patch 50 that seals the damaged area 48, as shown in FIG. 4. This material must not shrink away from any surface, be flexible enough not to crack when expansion or contraction occurs, and be fully resistant to gasoline or distillate fuels of all types. A cutaway side view of the patch 50 is shown in FIG. 5.

In another embodiment of the invention, after priming with THIOKOL® TPR-415, a containment form is built around the leak to provide enough thickness and strength to seal the area. An example would be a leaking flange where the upper and base portions of the sump are joined together. This embodiment entails building a circular trough or dike around the flange and filling the trough or dike with a gasoline and other hydrocarbon resistant rubber compound, such as the two part THIOKOL® T-2235-M or RLP-2078 polysulfide rubber, to seal the damaged area and provide added mechanical strength to withstand external hydraulic pressure.

Another embodiment of the invention is the repair of the leak in the bottom of the sump or in the flange attaching the sump to the tank or riser. After the preparation described above and after priming with THIOKOL® TPR-415, the two part rubber, THIOKOL® RLP-2078 is poured into the bottom of the sump, completely sealing the bottom flange or the leak.

What is claimed is:

1. A method of repairing a leak in a polyethylene fuel containment sump, comprising the steps of:

cleaning an area of a polyethylene fuel containment sump, wherein said polyethylene sump defines a leak within said area;

washing said area with xylene;

washing said area with acetone;

drying said area; and covering said area with a gasoline resistant rubber compound which is composed essentially of polysulfide rubber, and which adheres to the polyethylene sump to repair said leak in said polyethylene fuel containment sump.

\* \* \* \* \*